Patented Nov. 5, 1940

2,220,212

UNITED STATES PATENT OFFICE 2,220,212

EXTRACTION OF METALS FROM ORES

Allan J. Clark, Nathaniel Herz, and Earl Walter Adams, Lead, S. Dak.

No Drawing. Application May 27, 1940, Serial No. 337,546

1 Claim. (Cl. 75—105)

The present invention relates to the extraction of metals from ores and more particularly to the extraction of gold or silver from ores by the cyanide process.

The cyanide process for the extraction of gold, silver or like metals from ores and/or concentrates, depends upon dissolving these metals by solutions of cyanides, such as sodium cyanide, in the presence of oxygen. The solutions must be alkaline, and to insure such alkalinity, it is customary to add lime or soda, the latter in the form of sodium hydroxide or sodium carbonate, to more than neutralize the acids in the ores formed by the oxidation of sulphide minerals present in gold or silver bearing ores. The term sulphide minerals as used includes sulpharsenides, sulpharsenates, sulphantimonates and tellurides, which are often present in gold or silver bearing ores.

The excessive addition of the protective agents, such as lime, sodium hydroxide or sodium carbonate to the ore solution to maintain alkalinity is often undesirable. These protective agents react with the sulphide minerals in the ores to form various compounds, such as sulphites, thiosulphites, thio-sulphates and sometimes colloidal sulphur and ferrous hydroxide. The addition of the cyanides to the mixture carries the reactions to the formation of thio-cyanates, ferrocyanides and similar compounds. The protective agents, usually lime or soda, are even more prone to react with the sulphide minerals in the presence of oxygen which is necessary to dissolve the said gold or silver in the cyanidation process for the extraction of gold or silver from ores and/or concentrates.

The excessive formation of thio-cyanates, ferrocyanides and similar compounds in the cyanidation extraction process diminishes or wholly consumes the available oxygen necessary for the solution of the gold or silver with the resultant slowing down or cessation of the dissolution of the same. At the same time the cyanide, which combines with the gold or silver to bring them into solution, may be diminished to such an extent in forming thio-cyanates, ferrocyanides and the like, that the rate of dissolution of the precious metals is seriously retarded.

We have found in the cyanidation extraction process that the reactions forming thio-cyanates and the like, are accelerated by an increase in temperature. It would be expected that the rate at which the precious metal dissolves is also similarly affected. However, this possible result is more than offset by the more rapid oxidation of the sulphur compounds, utilizing the available oxygen which is necessary to bring the gold or silver into solution. The ultimate result is a less complete recovery of the precious metals and/or an increased consumption of chemicals and/or a retarded rate of extraction. An increased percentage of the sulphide minerals in the ore or concentrate increases the above effects. Sulphides of less stable composition, such as arsenopyrite and pyrrhotite, when present in the ore or concentrate are more detrimental to precious metal extraction than are the more stable sulphides, such as pyrite, because of their greater activity in reacting with the available oxygen and cyanides present.

With the above information in mind, it is an object of this invention to use refrigerating or other suitable cooling means in the extraction of metals from ores and/or concentrates.

Another object is to use refrigerating means in connection with the cyanidation process for the extraction of gold or silver from ores.

Another object is to provide in the cyanidation process for the extraction of gold or silver from ores, the step of maintaining the reactants used in the said extraction process and the products obtained, at a temperature ranging from 32° to 50° F. during the period in which the gold or silver is extracted from the ore.

Other and further objects and advantages of this invention will be apparent from the following description and from the claim appended hereto.

According to the present invention gold or silver bearing ores when treated by the cyanidation extraction process give a greater percentage yield of gold or silver and/or a decreased consumption of chemicals, when the temperature of the ores or concentrates is reduced by refrigeration or other suitable cooling means to a temperature ranging from 32° to 50° F. The reduction in temperature may be accomplished by either reducing the temperature of the solutions used, the air supplied to furnish the oxygen, or the ore or concentrate. Under certain conditions it may be desired to reduce the temperature of all or several of the reactants to such a degree that the proper working temperature will be reached and maintained during the extraction period.

Due to the cost of the power and equipment required to maintain the temperature in the neighborhood of the freezing point of the solution from which the gold or silver is extracted, it is preferred to work at a temperature ranging from 35° to 50° F. A working temperature of 40° F. was found convenient.

It is preferred to reduce the temperature of the solutions before bringing them in contact with the material under treatment as it is more convenient to refrigerate the solutions used than the air supplying the oxygen in the reaction or the gold or silver bearing ores. To maintain temperatures within a certain temperature range over a period of time preferably requires the use of suitable cooling means, such as water-jacketed vessels.

Example

The following data resulted from a gold extraction from pyrrhotite concentrates reground to a fineness where 75% would pass a sieve of 325-mesh. The several tests were run on lots of concentrates assaying from 0.6 to 0.75 oz. of gold per ton.

In carrying out the tests, lots of 1000 grams of the concentrate were each agitated with lime for a four hour period, agitation was then continued for a period of 17.5 hours in small Pachuca tanks, using air as the agitator. The cyanide solution was in contact with the concentrates throughout this period.

The Pachuca tanks were water-jacketed, the temperature of the jacket water being controlled by a mechanically operated water-cooler.

|  | Test No. | | | |
| --- | --- | --- | --- | --- |
|  | 1 | 2 | 3 | 4 |
| Temperature, °F.: | | | | |
| At start | 45 | 50 | 60 | 70 |
| At end | 41 | 50 | 57 | 72 |
| pH of solutions | 10.7 | 10.4 | 10.4 | 10.0 |
| Cyanide consumed; lbs. per ton | .55 | 1.35 | 1.63 | 2.32 |
| Extraction, percent | 89.1 | 82.9 | 82.4 | 76.3 |

Qualitative examination of the effluent solutions show:

| Thiocyanate | Low | High | Very high | Very high |
| --- | --- | --- | --- | --- |
| Ferrocyanides | Traces | Low | High | High |

The above series carried a high pH. A similar series, with a lower pH, confirmed the results, but consumed more cyanide. However, the thiocyanate noted in this second series, which is given below, shows that less cyanide has reacted with the sulphides under these conditions.

Thiocyanates, low pH series ........... Traces Low High High

The above tests are illustrative of the invention and it is not intended to limit the scope thereof to the data given for this purpose.

It is to be understood that this invention broadly relates to the extraction of metals from ores and/or concentrates under substantially reduced temperatures and more particularly to the cyanidation process for the extraction of precious metals, e. g. gold or silver, wherein the reactants and products entering in the chemical extraction of the metals are maintained substantially in the temperature range of 32° to 50° F. during the extraction period and preferably in the neighborhood of 40° F. depending upon operating conditions, percentage of sulphide minerals present in the ores, and the degree of fineness of the ore being treated.

Modifications of this invention will be apparent to those skilled in the art without departing from the spirit thereof and it is therefore desired to be limited only by the scope of the appended claim.

What is claimed is:

In the cyanidation process for the extraction of gold, silver or the like from ores and/or concentrates, the step of artificially cooling at least one of the reactants to such a temperature so as its mixture with the remaining reactants maintains the temperature of all of the reactants and products at a temperature ranging from 32° to 50° F. during the extraction period.

ALLAN J. CLARK.
NATHANIEL HERZ.
EARL WALTER ADAMS.